US006877008B1

United States Patent
Kirkpatrick et al.

(10) Patent No.: US 6,877,008 B1
(45) Date of Patent: Apr. 5, 2005

(54) RULES ENGINE FOR TELECOMMUNICATION CIRCUIT ATTRIBUTE IDENTIFICATION

(75) Inventors: Mark Kirkpatrick, Conyers, GA (US); John Strohmeyer, Norcross, GA (US); Darrin Morrow, Acworth, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 483 days.

(21) Appl. No.: 10/000,478

(22) Filed: Oct. 24, 2001

(51) Int. Cl.[7] .............................................. G06F 17/30
(52) U.S. Cl. ..................................... 707/10; 707/104.1
(58) Field of Search ................................ 707/10, 104.1

(56) References Cited

U.S. PATENT DOCUMENTS 5,687,224 A  *  11/1997  Alley et al.  ............  379/201.12
5,745,694 A  *  4/1998   Egawa et al.  ................  709/225
6,341,130 B1 *  1/2002   Lakshman et al.  ..........  370/389

OTHER PUBLICATIONS

CrispORB High performance CORBA for System Area Network, Aug. 1999, Proceedings or the Eight International Symposium on High Performance Distributed Computing, IEEE, pp. 11–18.*

* cited by examiner

Primary Examiner—Jack M. Choules
(74) Attorney, Agent, or Firm—Merchant & Gould

(57) ABSTRACT

A system and method for determining attributes associated with a telecommunication network circuit. In accordance therewith, disclosed is a first computer; a second computer in communication with the first computer, the first computer transmitting a query to the second computer for attributes associated with a telecommunication network circuit, the first computer transmitting to the second computer a telecommunication network circuit ID number; a database in communication with the second computer, the database having the attributes associated with the telecommunication network circuit stored therein; and a rules engine for determining the attributes associated with the telecommunication network circuit identified by the telecommunication network circuit ID number.

30 Claims, 6 Drawing Sheets

RULES ENGINE FOR TELECOMMUNICATION CIRCUIT ATTRIBUTE IDENTIFICATION

BACKGROUND

1. Technical Field

The invention broadly relates to telecommunications systems and methods, and more particularly, to telecommunication systems and methods for determining attributes associated with telecommunication networks.

2. Description of the Related Art

Telecommunication network circuits are prevalent throughout the world. There are, however, many different types of telecommunication network circuits ranging from the common plain old telephone service (POTS) to more sophisticated ISDN lines, T-1 lines, T-3 lines, DS0, DS1 and a variety of other types of telecommunication network circuits. Different types of telecommunication network circuits have associated therewith a variety of attributes including telecommunication network circuit capacity, speed escalation and various other business related attributes. For example, the expiration times associated with each telecommunication network may be different, some may not be eligible for escalation, and some may be serialized while others may be non-serialized. Accordingly, there exist a variety of attributes that may be available for any or all of them.

Software systems associated with each telecommunication network circuit type generally behave differently based on the type of telecommunication network circuits and their associated attributes. Accordingly, for a software system to properly manage a particular telecommunication network circuit it must know the telecommunication network circuit type it is operating with. The type of a particular telecommunication network circuit can be determined using the telecommunication network circuit identifier (ID) number, which is a unique number associated with the telecommunication network circuit type. There are well known algorithms that can be used to determine a telecommunication network circuit type based on the telecommunication network circuit ID number.

There exist a growing number of applications in the telecommunication area that require more information about a particular telecommunication network circuit. For example, some applications must know a telephone network circuit's attributes, the validation of such attributes and other relevant information that may become relevant in the future with the advances in technology. The attributes of a T-3 telephone network circuit, for example, may change when another type of telephone network circuit is introduced in the future.

Conventional systems for determining attributes associated with telecommunication network circuits generally provide software code for the software applications for each individual type of telephone network circuit. This, however, is inefficient and redundant because essentially the same code resides across several different systems, thus increasing the overall code base and the size of the binary files associated with each software application. Having different software code creates the problem of having to reintroduce code and re-release code whenever a change is made to an attribute associated with a telephone network circuit.

Furthermore, conventional systems for determining attributes associated with telecommunication network circuits generally function in one of two ways. In one way, the information is coded into the application itself or the application contains a subset of a rule-based system. In another way, the application will go directly to a legacy system, which comprises a portion of a telecommunication network that dictates what attributes are associated with certain network circuits, and the software system can obtain the required attribute data directly from the legacy system. One problem with conventional approaches is that legacy databases are not optimized to provide attribute data and many databases may have to be searched in order to find the required data. For example, a software application may typically have to operate across several different interfaces and use techniques such as screen scraping to ascertain the required attributes information. Most legacy systems are not dedicated to obtaining attributes and most will have network latency delays of at least 30 seconds and may sometimes exceed several minutes.

There are several related art methods and systems for determining attributes associated with telecommunication network circuits and various software applications associated with different telecommunication network circuits. FIG. 1 illustrates one related art system 10 where different telecommunication network circuits 12, 14, 16 are associated with different software applications 18, 20, 22, respectively. Those skilled in the art will appreciate that the program logic can reside in the individual software applications 18, 20, 22 or can reside in a shared library among the software applications 18, 20, 22. For example, instructions associated with each of the software applications 18, 20, 22 can be executed by one central computer 24 in communication with a commonly shared database 26 that includes the attributes associated with the telecommunication network circuits 12, 14, 16. Alternatively, the instructions associated with each software application 18, 20, 22 can be executed on separate computers 28, 32, 36, respectively, wherein each computer 28, 32, 36 is in communication with databases 30, 34, 38, respectively. The individual databases 30, 34, 38 include the attributes of each telecommunication network circuit 12, 14, 16, respectively.

The related art system 10 suffers from several drawbacks, however. Namely, the system 10 is not dynamic and any changes in the telecommunication network circuit 12, 14, 16 types or attributes must be accompanied by a corresponding change in the software applications 18, 20, 16, respectively. This process further includes new releases of the software code, rebuilding, retesting and other overhead associated with updating the code in a software application. The system 10 also is inefficient because of redundancies in the code involved.

FIG. 2 illustrates another related art system 50 that uses information from a legacy system 52 in communication with a database 54 for determining attributes associated with each telecommunication network circuit 12, 14, 16 types and their behavior. The central computer 24 queries the legacy system 52 to retrieve data associated with the one or more telecommunication network circuits 12, 14, 16 stored in the database 54, for example. The data in the database 54 includes attributes of each telecommunication circuit types 12, 14, 16. The data, however, is generally not optimized for the specific information desired by the relative software applications 18, 20, 22. Network latency and accessibility are further drawbacks of this related art system 50.

Accordingly, there is a need to determine telephone network attributes without querying legacy systems. There is a further need to improve the performance and maintainability of a client software application adapted for one or more telephone network circuits.

SUMMARY

According to one aspect, the invention provides a system for determining attributes associated with a telecommunication network circuit. The system includes a first computer in communication with a second computer, the second computer transmitting a query to the first computer for attributes associated with a telecommunication network circuit, the second computer transmitting to the first computer a telecommunication network circuit ID number; a database in communication with the first computer, the database having the attributes associated with the telecommunication network circuit stored therein; and a rules engine for determining the attributes associated with the telecommunication network circuit identified by the telecommunication network circuit ID number.

According to another aspect, the invention provides a computer system. The system includes a server including a software application for executing instructions associated with a software application that utilizes a telecommunication network circuit ID number for determining one or more attributes associated with a telecommunication network circuit; a client including a second software application for interfacing with a user and transmitting the telecommunication network circuit ID number to the server; and wherein, the server receives the circuit ID number from the second software application and determines various attributes associated with the network circuit based on the circuit ID number.

A further aspect of the invention provides a system for determining attributes associated with a telecommunication network circuit. The system includes means for transmitting a request for attributes associated with a telecommunication network circuit from a first computer to a second computer, the request including a telecommunication network circuit ID number; and means for executing a set of rules by the second computer for determining the attributes associated with a telecommunication network circuit type identified by the telecommunication network circuit ID number.

Yet another aspect of the invention provides a method for determining attributes associated with a telecommunication network circuit. The method includes transmitting a request for attributes associated with a telecommunication network circuit from a first computer to a second computer, the request including a telecommunication network circuit ID number; and executing a set of rules by the second computer for determining the attributes associated with a telecommunication network circuit type identified by the telecommunication network circuit ID number.

Still another aspect of the invention provides a method for determining attributes associated with a telecommunication network circuit. The method includes providing a telecommunication network circuit ID number from a software application to an application server; retrieving information associated with a telecommunication network circuit based on the telecommunication network circuit ID number from a database, the database being in communication with the application server; processing the information according to a predetermined set of rules; and returning the information to the software application.

These and various other aspects of the invention are pointed out with particularity in the claims annexed hereto and forming a part hereof. For a better understanding of the invention, however, reference should be made to the drawings which form a further part hereof, and to the accompanying descriptive matter, in which there illustrated and described specific examples of a system and method in accordance with the invention.

BRIEF DESCRIPTION OF DRAWINGS

Further advantages of the invention may be better understood by referring to the following description taken in conjunction with the accompanying drawings, in which.

DESCRIPTION

Figure 1:
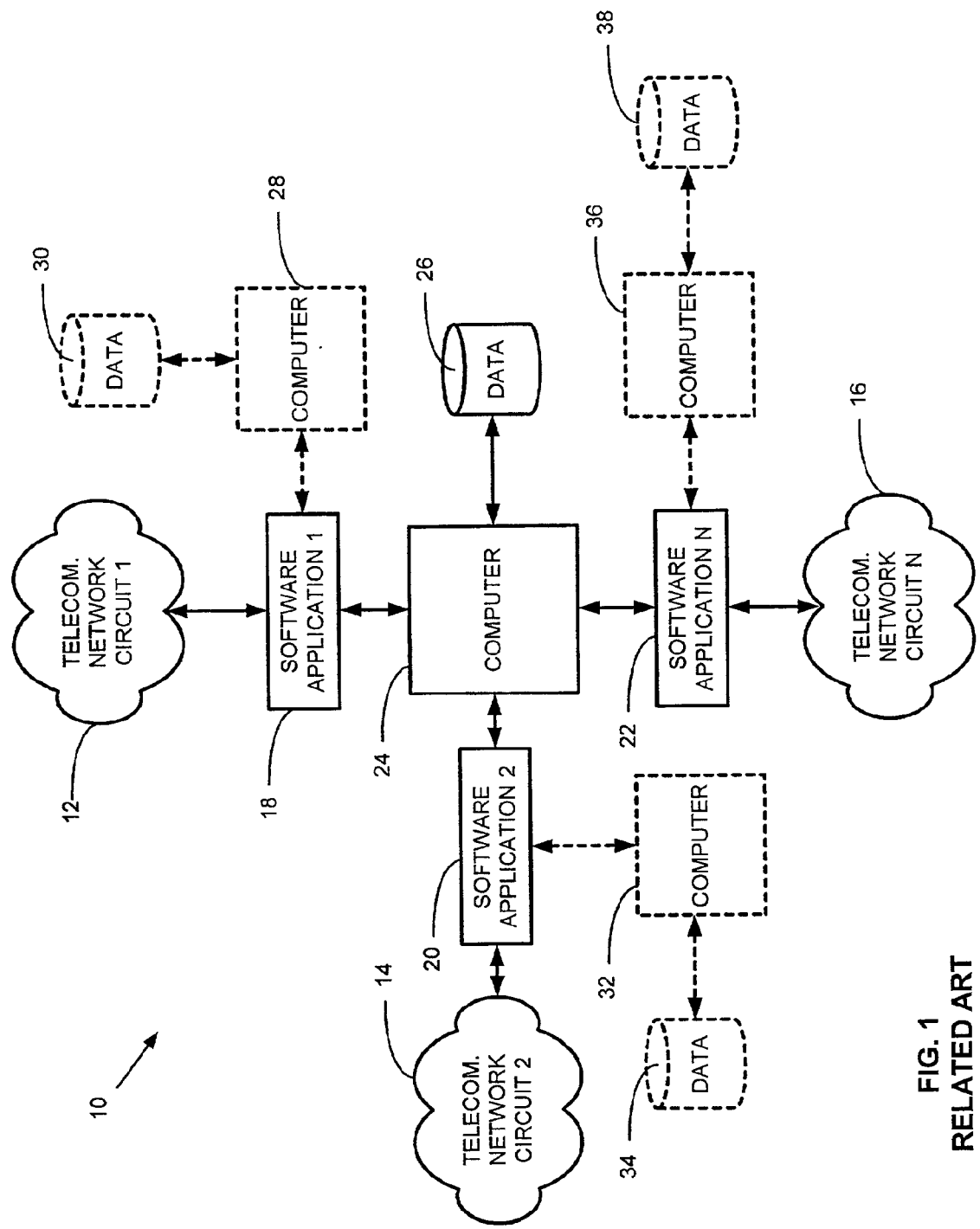
FIG. 1 illustrates a related art system where different telecommunication network circuits are associated with different software applications.
Figure 2:
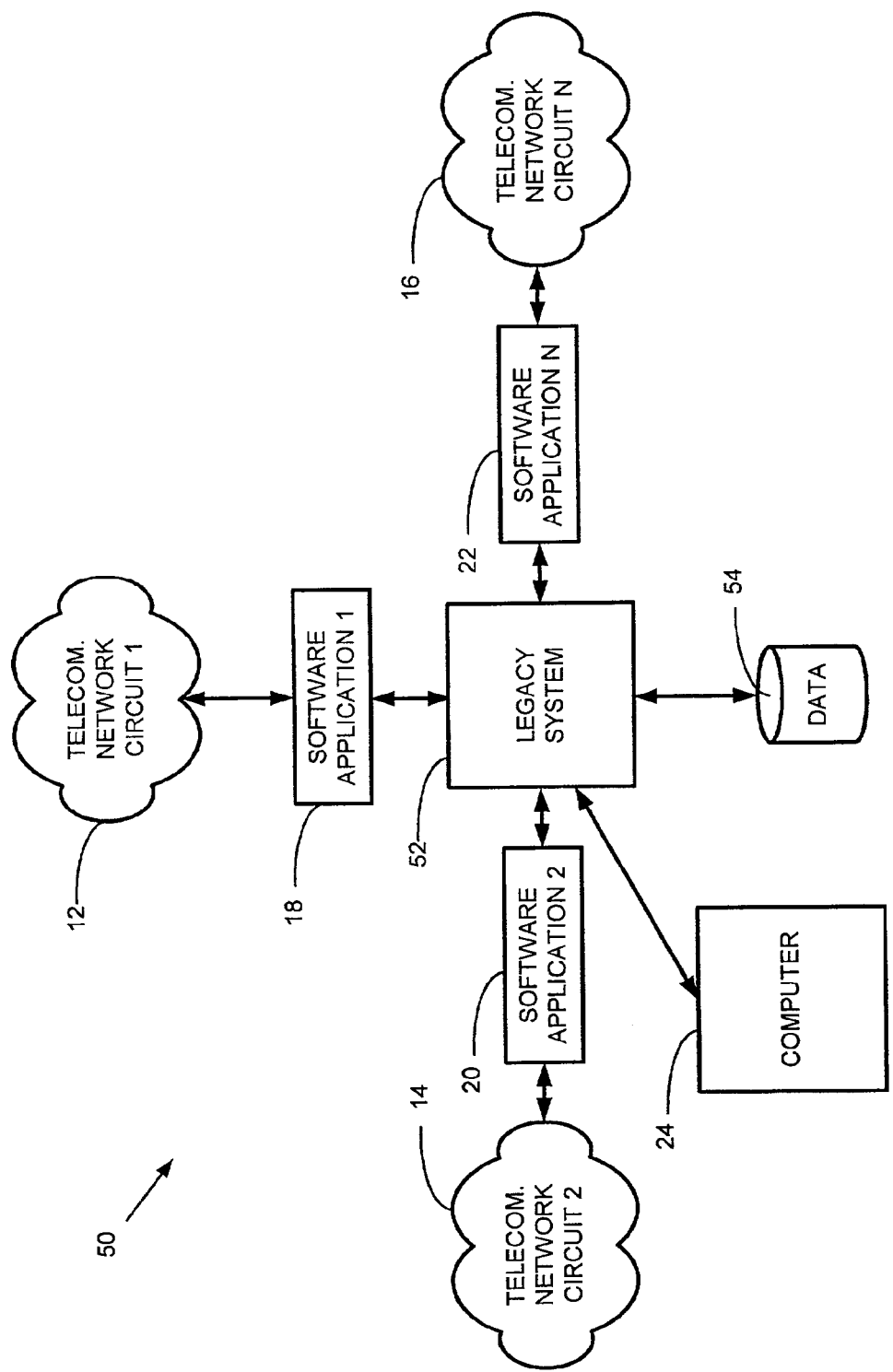
FIG. 2 illustrates another related art system that uses information from a legacy system in communication with a database for determining attributes associated with a telecommunication network circuit.

In one embodiment the invention generally provides a computer system, such as, for example, a software application server, for executing instructions associated with a software application that utilizes a telecommunication network circuit ID number for determining one or more attributes associated with the telecommunication network circuit. The computer system receives the circuit ID number from any requesting application in communication with the application server that may require information about a telecommunication network circuit. Once the computer system receives the telecommunication network circuit ID number it determines various attributes associated with the network circuit based on the circuit ID number. The attributes are then communicated back to the requesting or calling application that performed the query. In one embodiment, the computer system may pass control to a software application that utilizes a rules based engine for determining the attributes associated with the telecommunication network circuit based on the network circuit ID number. Those skilled in the art will appreciate that a single software application can be utilized to perform the querying function as well as the attribute determining function without departing from the scope of the invention.

In one embodiment the invention provides a computer method for communicating with a variety of software applications transmit requests or queries to an application server for information regarding attributes associated with a telecommunication network circuit. The queries provide the application server computer with a telecommunication network circuit ID number and the application server computer executes a set of rules for determining one or more attributes associated with the telecommunication network circuit based on the network circuit ID number. In one embodiment the method includes providing a circuit ID number from a software application to an application server, retrieving information associated with a telecommunication network circuit based on the circuit ID number from a central database, processing the information according to a predetermined set of rules and returning the information to the software application. In another embodiment, the method further includes storing the resulting information in the central database. In yet another embodiment, the method includes determining one or more attributes of a plurality of telecommunication network circuits from a central location.

In accordance with one embodiment of the invention, changes can be made to the attributes associated with the one or more telecommunication network circuits without affecting the calling or requesting software application. For example, when attributes associated with a telecommunication network circuit are updated, the calling software application does not have to be recompiled, recoded or retested. Thus, the method eliminates a time consuming and expensive aspect of conventional methods used for determining and updating attributes associated with telecommunication network circuits.

Figure 3:
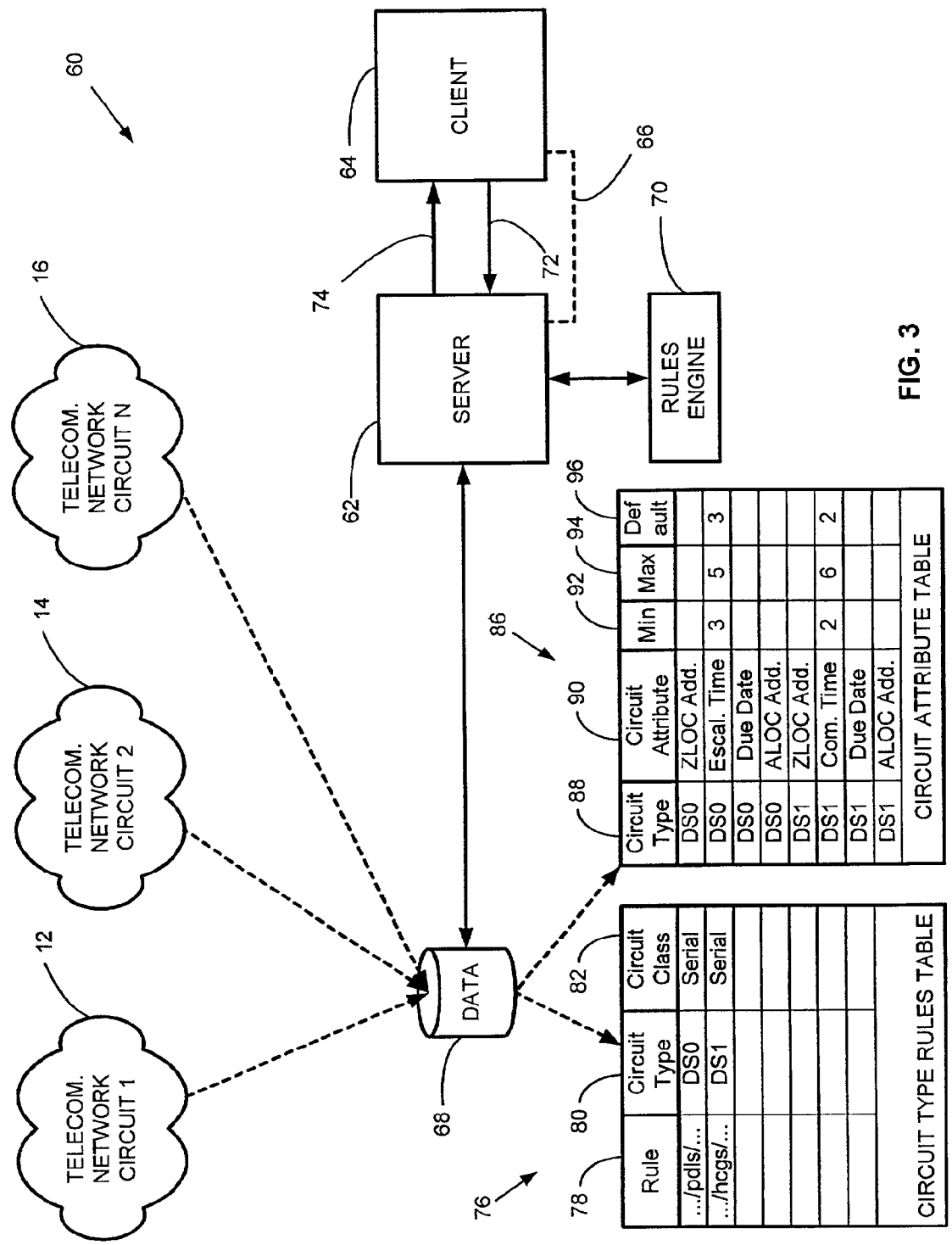
FIG. 3 illustrates one embodiment of a client-server system for determining attributes associated with a telecommunication network circuit.

Turning now to FIG. 3 where one embodiment of a client-server system 60 for determining attributes associated with one or more telecommunication networks is illustrated. In one embodiment, the system 60 includes an application server 62 in communication with a client 64, forming a client-server network 66. The application server 62 is in communication with a database 68. The database 68 contains data associated with one or more telecommunication network circuits 12, 14, 16. This includes any rules for determining the telecommunication network circuit type and attributes for each of the network circuit types. In one embodiment of the invention, the rules can be specified using a well-known concept referred to as regular expressions. The client-server 66 network architecture can be of a conventional nature, providing conventional functionality such as query 72 and response 74 functions between the client 64 and the application server 62. The application server 62 either includes a rules engine 70 or is in communication with a rules engine 70 for determining attributes associated with the telecommunication network circuits 12, 14, 16. There can be a plurality of clients in communication with the application server 62 without departing from the scope of the invention.

In one embodiment of the invention, the rules engine 70 can be implemented in the form of a set of instructions acting as the primary building blocks of a software application for determining attributes associated with the telecommunication network circuits 12, 14, 16 in accordance with the network circuit's ID number. In one embodiment, when a computer, such as the client 64 computer for example, sends a query to the application server 62 for attribute information associated with a particular telecommunication network circuit 12, 14, 16, the client 64 provides the network circuit ID number to the application server 62. Conventional circuit ID numbers are generally 40-digits long comprising a combination of numbers and characters. Those skilled in the art will appreciate, however, that the invention is not limited to such ID number formats and can be adapted to suit a variety of different formats used by different telecommunication service provides and telecommunication equipment manufacturers.

The telecommunication network circuit ID numbers and formatting can differ, therefore, depending on the type of telecommunication network circuit 12, 14, 16 or based on the manufacturer or owner of the telecommunication network circuit 12, 14, 16. In one embodiment the telecommunication network circuit ID number is stored in the database 68 in the form of a circuit type rules look-up-table 76. When the querying computer, e.g., the client 64, provides the telecommunication network circuit ID number to the application server 62, a software application associated with the application server 62 retrieves information associated with the telecommunication network circuit 12, 14, 16 based on the network circuit ID number. In one embodiment, some of the information includes retrieving the network circuit type from a circuit type rules look-up-table 76. The circuit type rules look-up-table 76 can be compiled or built manually or automatically. In one embodiment of the invention, a software application can be used to customize the circuit type rules look-up-table 76 through data management techniques. The software application itself, however, does not have to be recompiled and no rebuilding of the software code is required whenever changes are made to the circuit type rules look-up-table 76.

The rules engine 70 according to one embodiment of the invention is based on the circuit type rules look-up-table 76 stored in the database 68. In one embodiment, the circuit type rules look-up-table 76 can take the form shown in FIG. 3 comprising a "Rule" 78 portion, a "Circuit Type" 80 portion and a "Circuit Class" 82 portion. For example, if a software application running on the client 64 queries the application server 62 and provides the network circuit ID number for a DS0 type telecommunication network circuit, the application server 62 executes a series of instructions associated with the rules engine 70 and searches the circuit type rules look-up-table 76 looking for a specific rule for determining where a DS0 type of telecommunication circuit is located.

The application server 62 then searches the Rule 78 portion of the circuit type rules look-up-table 76. If the rule contains a string, such as for example, ". . . /pdls/ . . . ," the application server 62 knows that the information it requires is located somewhere within the string. (The continuous dots indicate that there is no other data contained within the string.) Using similar regular expressions a variety of information can be inserted within the string. For example, information can be inserted in the string to indicate some combination of characters, ranges and the like. Accordingly, when the application server 62 initiates a call to the rules engine 70, it provides the rules engine 70 with the telecommunication network circuit ID number received from the client 64 application. The application server 62 also will provide the rules engine 70 with a container for storing the response containing the attributes or other requested information. In one embodiment, this can be implemented using an interface definition language (IDL), for example. The software application then knows where to send the response data back to.

When the application server 62 receives the network circuit ID number, it analyzes the circuit ID number and determines whether it meets any of the predefined rules in the Rule 78 portion of the circuit type rules look-up-table 76 using well known regular expressions and string matching techniques. This process allows the application server 62 to determine, based on the network circuit ID number, whether the telecommunication network circuit 12, 14, 16 identified by the circuit ID number is one of any known types of network circuit stored in the Circuit Type 80 portion of the circuit type rules look-up-table 76. Using the circuit type rules look-up-table 76 the application determines which one of the various known network circuit types it is dealing with (e.g., POTS, DS0, DS1, ISDN lines, T-1, T-3, and the like).

Once a circuit type is identified in the Circuit Type 80 portion of the circuit types rules look-up-table 76, e.g., a DS0 circuit type, the software application also will identify what circuit class the circuit type belongs to from the Circuit Class 82 portion of the circuit type rules look-up-table 76. In one embodiment, the Circuit Class 82 portion of the circuit type rules look-up-table 76 provides, for example, whether a circuit type is a serialized type or a non-serialized type. Those skilled in the art will appreciate that any data stored within the circuit type rules look-up-table 76 must be initially set up or populated in the database 68. Thus, the system 60 will generally have some administrative overhead associated with it in order to populate the Rule 78 portion, the Circuit Type 80 portion and the Circuit Class 82 portion of the circuit type rules look-up-table 76.

Once the network circuit ID number is passed to the application server 62 and the circuit type is determined from the circuit type rules look-up-table 76, the attributes associated with that specific circuit type are provided back to the calling software application at the client 64. The circuit type is the key for determining the attributes associated with the one or more telecommunication network circuit 12, 14, 16 identified by the circuit ID number. These attributes, once identified, are returned to the calling application (e.g., the client 64 application) in the container provided by the calling software application, for example.

The attributes associated with the one or more telecommunication network circuits 12, 14, 16 are provided in a circuit attribute look-up-table 86 comprising a "Circuit Type" 88 portion, a "Circuit Attribute" 90 portion, a "Min Value" 92 portion, a "Max Value" 94 portion and a "Default" value 96 portion. Although the circuit type rules look-up-table 76 and the circuit attribute look-up-table 86 are shown as two separate look-up-tables, they can be provided as a single look-up-table without departing from the scope of the invention. In one embodiment of the invention, if the rules engine 70 retrieves a DS0 circuit type based on the network circuit ID number from the circuit type rules look-up-table 76, the rules engine 70 proceeds to the circuit attribute look-up-table 86 and returns, for example, the attributes identified therein for that particular circuit type. In one embodiment the circuit attributes 90 are provided in one portion of the circuit attribute look-up-table 86 and comprises, for example, four pieces of information.

If the circuit type retrieved is a DS0 circuit, for example, the rules engine 70 returns a ZLOC Address, an Escalation Time, a Due Date and an ALOC Address. In addition, the rules engine 70 returns a "Min Value" 92, a "Max Value" 94 and a "Default Value" 96. Those skilled in the art will appreciate, however, that additional pieces of information can be provided in the circuit attribute look-up-table 86 among other attributes associated with the one or more telecommunication network circuits 12, 14, 16, such as, for example, circuit fault values, circuit validation data as may be required by a particular client 64, and the like.

Those skilled in the art will appreciate that there exists the possibility that a generic attribute database may change. If so, at least two approaches may be taken. The user at the client 64 computer can have a system administrator provide notification that a change is necessary and the change can be carried out manually, or the user can run a polling process that goes out to the legacy system 52 and retrieves any new attributes data from an original database on a periodic basis. This process may be carried out every two hours, every two days, or whatever the user feels is appropriate without departing from the scope of the invention. All of these features are configurable in the application to make it smarter. In fact, the application can be originally set up to populate the look-up-tables 76, 86 automatically rather than populating them manually.

Those skilled in the art will appreciate that in one embodiment, the invention can be provided as a web-based provisioning system for telecommunication network circuits rather than in the form of a client-server 66 network architecture. This could be provided, for example, at a point where a telephone carrier interfaces with one or more telecommunication network circuits 12, 14, 16. The telecommunication circuit ID number then could be provided at the interface. Accordingly, a remote user application could then access a web server and pass the telecommunication network circuit ID number to it and to the rules engine 70 in communication with the web server. As discussed above, in operation the rules engine 70 determines the telecommunication network circuit type associated with the circuit ID number from the circuit type rules look-up-table 76. The rules engine 70 can then access a list of attributes associated with the identified telecommunication network circuit type from the circuit attribute look-up-table 86 and pass the identified attributes as well as any fault values and validation data to the web server and back to the remote user application interfaced with the web server.

At the interface a web page could be built dynamically for providing the user with information that the telecommunication network circuit 12, 14, 16 will be provisioned from the interface location. Accordingly, as changes are made to the various attributes associated with corresponding telecommunication network circuits 12, 14, 16 there is no need to have the attribute information hard coded, and the user accesses the web page, calls the rules engine 70, and the attribute data is sent back to the remote user, who can use the attribute data received from the rules engine for validation purposes. After validation, the information is submitted and it provisions a telecommunication network circuit.

The rules engine 70 passes generic values to the user that is eligible for the particular type of telecommunication network circuit 12, 14, 16 that was provisioned. The telecommunication network circuit ID number that is passed has a predefined composition that can be used, for example, to determine the telecommunication network circuit type. Accordingly, the user is provided with the necessary information to appropriately provision that telecommunication network circuit 12, 14, 16 with. The entire process is executed dynamically, which is in contrast to how the process is performed in conventional systems.

Figure 4:
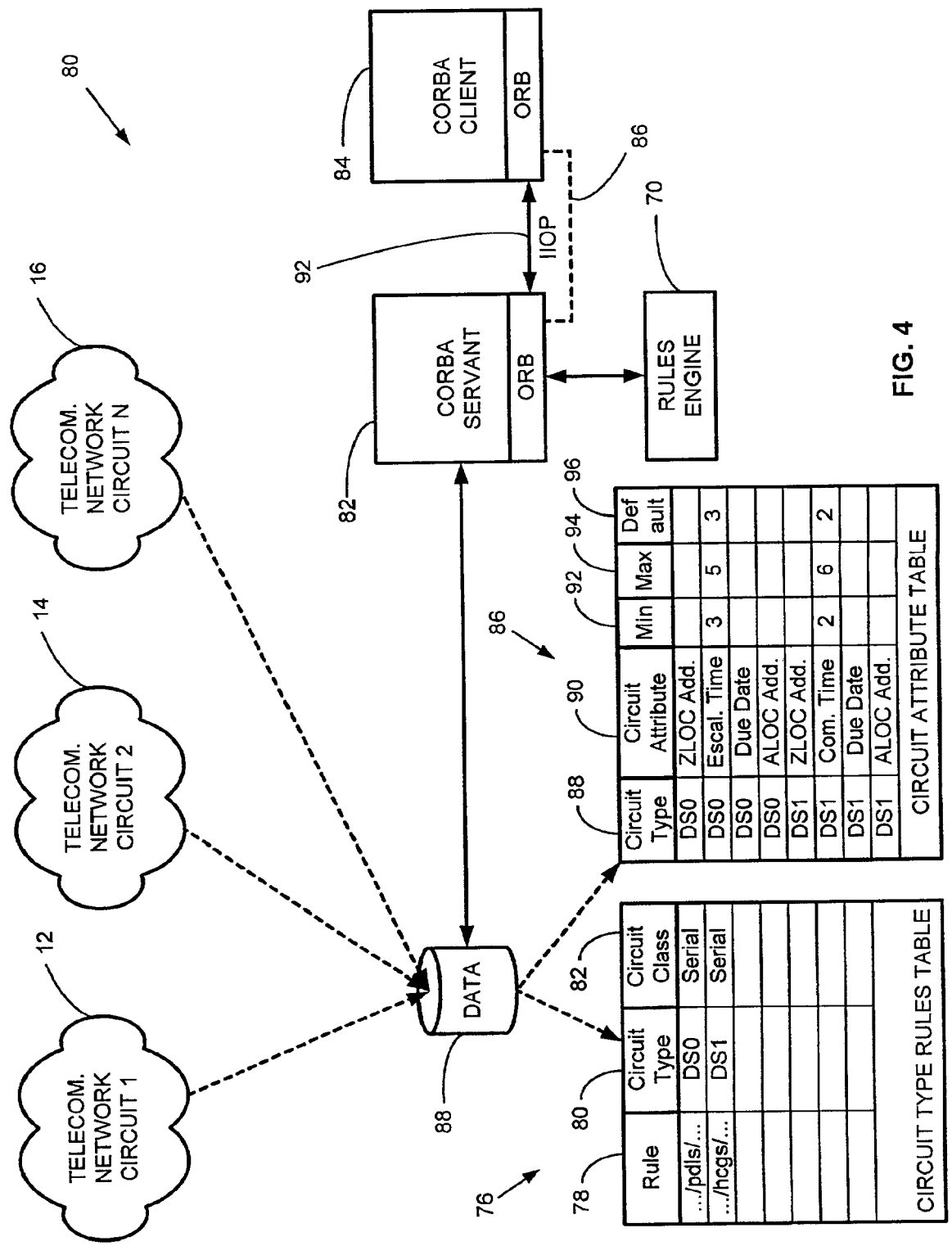
FIG. 4 illustrates one embodiment of a CORBA network based system for determining attributes associated with a telecommunication network circuit.

FIG. 4 illustrates a Common Object Request Broker Architecture (CORBA) based system 80 using a CORBA servant 82 and CORBA client 84 forming a CORBA network 86. When using the CORBA based system 80 location of the user is irrelevant and the user issue a request to ORBIX to connect to a particular machine and talk to a specific CORBA servant 82. The user can then register with the CORBA servant 82 it and it will continue processing. Those skilled in the art will appreciate that a CORBA network 86 is a distributed systems technology that is not tied to a single platform and provides good portability. CORBA services are described by an interface that is generally written in an Interface Definition Language (IDL).

In one embodiment of the invention, the CORBA servant 82 and the CORBA client 84 communicate by passing method calls through Object Request Brokers (ORBs). ORBs communicate via the Internet Inter-Orb Protocol (IIOP) 86. The IIOP 92 transactions can occur over Transport Control Protocol (TCP) streams, or by way of other protocols such as HTTP, for example. The CORBA network 86 provides an interface that is an independent method for communicating between applications that can be executed on different hardware platforms. Those skilled in the art will appreciate that a CORBA interface is an interface protocol that operates across different networks or can be resident and rely on the same platform. The IDL language that is common to both sides of a CORBA network 86 is used to enable the CORBA interface to operate transparently of the platform. The CORBA client 84 and the CORBA servant 82 have to use the common predefined IDL definition language that includes the structures within it, has the data requirements and the attributes. This is well known to those skilled in the art and is available from various publications.

The calling application can use the IDL to communicate with the CORBA servant 82. Accordingly, the CORBA servant 82 communicates with the rules engine 70 to provide the attributes associated with the telecommunication network circuit types in accordance with the telecommunication network circuit ID number. As discussed above the telecommunication network circuit types according to the telecommunication network circuit ID number are retrieved from the circuit type rules look-up-table 76. The list of attributes associated with that circuit type are then retrieved from the circuit attribute look-up-table 86. Accordingly, the attributes, a list of "min" and "max" values or validations are communicated back to the application server 82 and to the calling application on the client 84, for example, depending on how the system is set up.

In one embodiment of the invention, the rules engine 70 can use an established interface such as the CORBA servant 82 and CORBA client 84 to communicate with other software applications. Again, the CORBA servant 82 utilizes the network circuit ID number that is passed to it by the CORBA client 84 and returns the circuit type and a list of attributes in response. The CORBA client 84 application can then use the response data to dictate its behavior. For example, there can be provided a web based provisioning system for the one or more telecommunication network circuits 12, 14, 16. The web based system requests a network circuit ID number and the application then utilizes the rules engine 70 to determine the circuit type by searching the circuit type rules look-up-table 76. The rules engine 70 also can obtain a list of attributes associated with that circuit type from the circuit attribute look-up-table 86. The rules engine 70 also can provide validation information such as "max" and "min" values to be used to check the data input. This list of attributes would be used to construct a data entry page for provisioning the network circuit. The web page would then be displayed for user input. The resulting input is then passed to the appropriate legacy system 52 for provisioning the network circuit.

In one embodiment of the invention, the rules engine 70 can be the central location for providing various procedures for managing the one or more telecommunication network circuits 12, 14, 16. Multi-level logic to determine attributes and validations also can be provided in the CORBA servant 82. Any changes made to the application would ripple to the various software applications using it. Fewer releases of the system software would be required due to circuit information changes.

Figure 5:
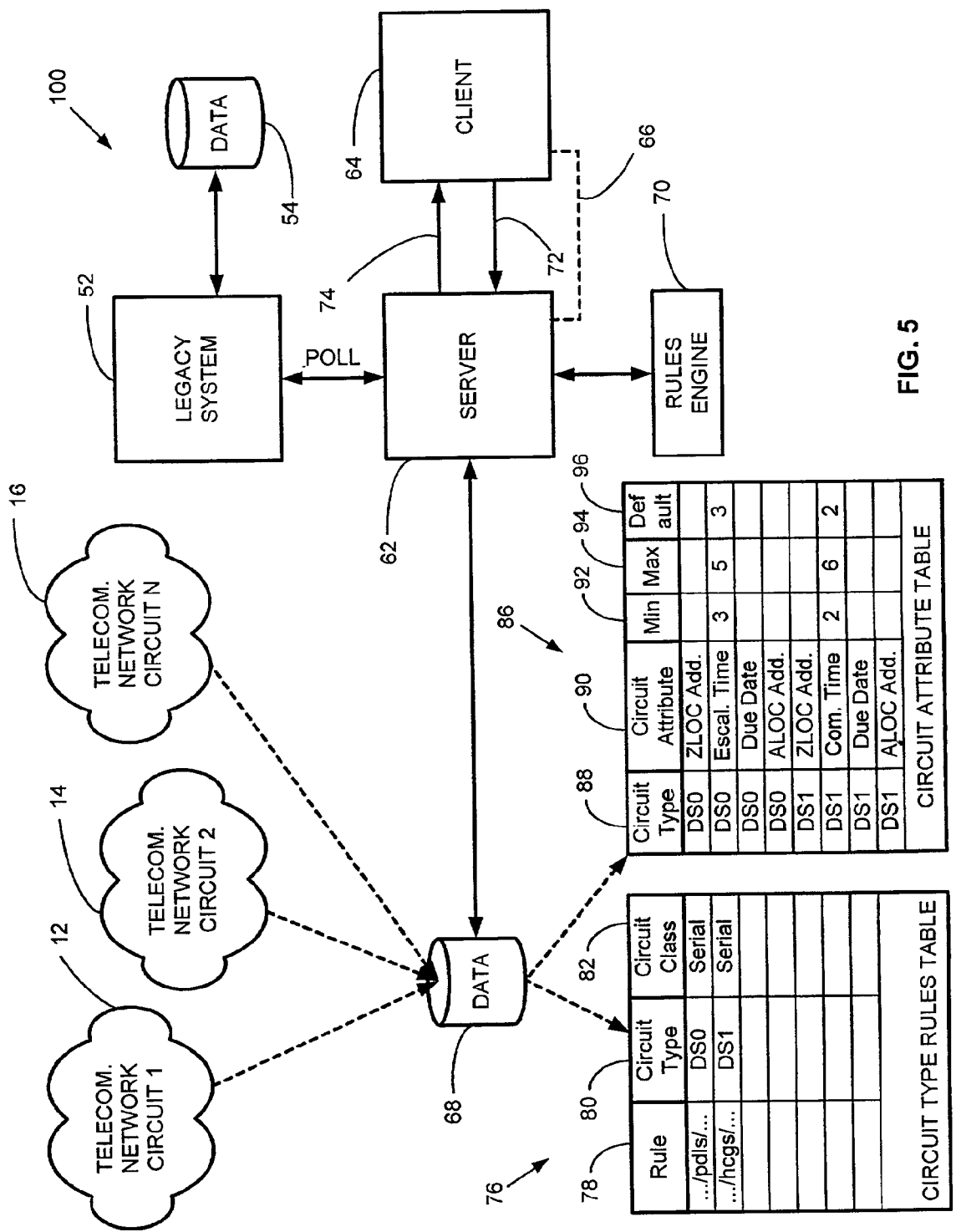
FIG. 5 illustrates one embodiment of a client-server system for determining attributes associated with a telecommunication network circuit in conjunction with a legacy system.

Turning now to FIG. 5, another embodiment of the invention is illustrated. The client-server system 100 operates essentially the same as the client-server system 60 illustrated in FIG. 3. The client-server system 100, however, provides additional functionality by interfacing the server 62 with the legacy system 52. The legacy system 52 is in communication with a legacy database 54. The legacy database 54 contains legacy information associated with the one or more telecommunication network circuits 12, 14, 16. The legacy database 54 contains updated attribute look-up-tables from the legacy system 52. Accordingly, the server 62 can access the updated attribute look-up-tables on a periodic basis by way of a polling function to the legacy system 52, for example, for updating the attribute look-up-tables. Accordingly, the rules engine 70 would always have access to updated information that is synchronized with the legacy system 52.

Figure 6:
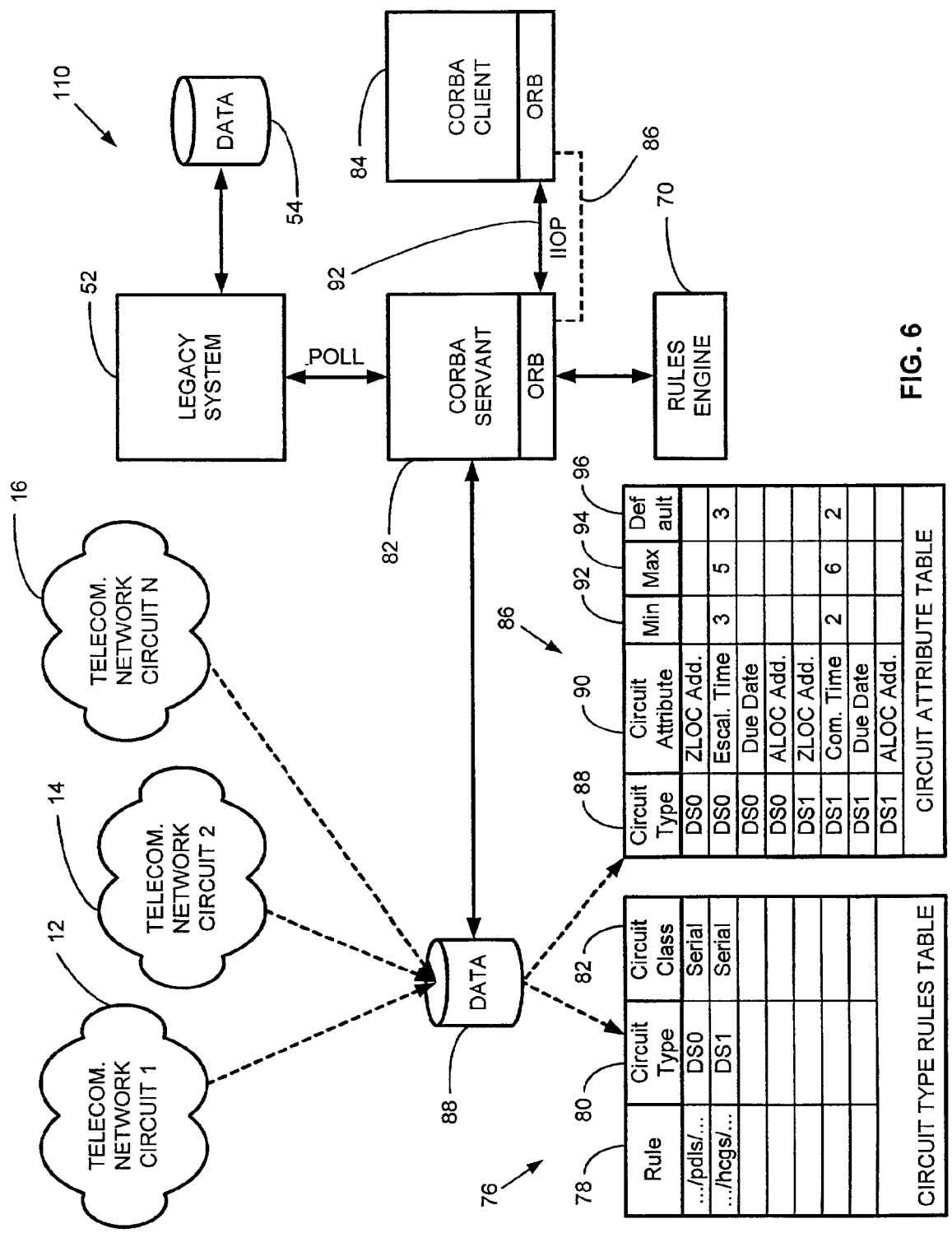
FIG. 6 illustrates one embodiment of a CORBA network based system for determining attributes associated with a telecommunication network circuit in conjunction with a legacy system.

FIG. 6 illustrates another embodiment of the invention. The CORBA network based system 110 operates essentially the same as the CORBA network based system 80 illustrated in FIG. 4. The CORBA network based system 110, however, provides additional functionality by interfacing the CORBA servant 82 with the legacy system 52. As discussed above in relation to FIG. 5, the legacy database 54 contains updated attribute look-up-tables from the legacy system 52. Accordingly, the CORBA servant 82 can access the updated attribute look-up-tables on a periodic basis by way of a polling function to the legacy system 52, for example, in order to update the attribute look-up-tables. Accordingly, the rules engine 70 would always have access to updated information that is synchronized with the legacy system 52.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A system for determining attributes associated with a telecommunication network circuit, comprising:

a first computer in communication with a second computer, the second computer transmitting a query to the first computer for attributes associated with a telecommunication network circuit, the second computer transmitting to the first computer a telecommunication network circuit ID number;

a database in communication with the first computer, the database having the attributes associated with the telecommunication network circuit stored therein; and a rules engine for determining the attributes associated with the telecommunication network circuit identified by the telecommunication network circuit ID number;

wherein the database contains a first look-up-table for storing circuit type rules associated with telecommunication network circuits.

2. The system of claim 1, wherein the second computer is a client and the first computer is a server and the first and second computers are adapted to form a client-server network.

3. The system of claim 2, further comprising a legacy system in communication with the first computer.

4. The system of claim 3, further comprising a second database in communication with the legacy system.

5. The system of claim 4, wherein the second database comprises updated attributes associated with telecommunication network circuits.

6. The system of claim 1, wherein the second computer is a CORBA client and the first computer is a CORBA server and the first and second computers are adapted to form a CORBA based network.

7. The system of claim 6, further comprising a legacy system in communication with the first computer.

8. The system of claim 7, further comprising a second database in communication with the legacy system.

9. The system of claim 8, wherein the second database comprises updated attributes associated with telecommunication network circuits.

10. The system of claim 1, wherein the first computer includes a web server.

11. The system of claim 1, wherein the database is populated automatically by the first computer.

12. The system of claim 1, wherein the first look-up-table includes portions selected from the group consisting of a rules portion, a circuit type portion and a circuit class portion.

13. The system of claim 1, wherein the database contains a second look-up-table for storing attributes associated with telecommunication network circuits.

14. The system of claim 13, wherein the second look-up-table includes portions selected from the group consisting of a circuit type portion, a circuit attribute portion, a min value portion, a max value portion and a default value portion.

15. The system of claim 1, wherein the attributes are selected from the group consisting of network circuit capacity, speed escalation, expiration time, serialized, non-serialized, due date, ZLOC address and ALOC address.

16. A computer system, comprising:
   a server including a software application for executing instructions associated with a software application that utilizes a telecommunication network circuit ID number for determining one or more attributes associated with a telecommunication network circuit;
   a client including a second software application for interfacing with a user and transmitting the telecommunication network circuit ID number to the server;
   a database in communication with the server, the database having the attributes associated with the telecommunication network circuit stored therein; and
   wherein, the server receives the circuit ID number from the second software application and determines various attributes associated with the network circuit based on the circuit ID number;
   wherein the database contains a first look-up-table for storing circuit type rules associated with telecommunication network circuits.

17. The system of claim 16, further comprising communicating the attributes back to the second software application that performed the query.

18. The system of claim 17, further comprising a rules based engine for determining the attributes associated with the telecommunication network circuit based on the network circuit ID number.

19. A system for determining attributes associated with a telecommunication network circuit, comprising:
   means for transmitting a request for attributes associated with a telecommunication network circuit from a first computer to a second computer, the request including a telecommunication network circuit ID number;
   means for executing a set of rules by the second computer for determining the attributes associated with a telecommunication network circuit type identified by the telecommunication network circuit ID number; and
   means for storing in communication with the first computer, the means for storing having the attributes associated with the telecommunication network circuit stored therein;
   wherein the means for storing contains a first look-up-table for storing circuit type rules associated with telecommunication network circuits.

20. A method for determining attributes associated with a telecommunication network circuit, comprising:
   transmitting a request for attributes associated with a telecommunication network circuit from a first computer to a second computer, the request including a telecommunication network circuit ID number;
   executing a set of rules by the second computer for determining the attributes associated with a telecommunication network circuit type identified by the telecommunication network circuit ID number; and
   parsing a string in a look-up-table for determining a telecommunication network circuit type in accordance with the telecommunication network circuit ID number.

21. The method of claim 20, wherein transmitting a request includes transmitting a plurality of requests to the second computer from a plurality of first computers.

22. The method of claim 20, further comprising automatically updating the attributes.

23. The method of claim 20, further comprising storing an initial set of attributes in a database and updating the attributes on a periodic basis.

24. The method according to claim 20, further comprising retrieving attributes from the look-up-table and providing the attributes to the first computer.

25. A method for determining attributes associated with a telecommunication network circuit, comprising:
   providing a telecommunication network circuit ID number from a software application to an application server;
   retrieving information associated with a telecommunication network circuit based on the telecommunication network circuit ID number from a database, the database being in communication with the application server;
   processing the information according to a predetermined set of rules;
   returning the information to the software application; and
   parsing a string in a look-up-table for determining a telecommunication network circuit type in accordance with the telecommunication network circuit ID number.

26. The method of claim 25, further comprising storing the information in the database.

27. The method of claim 25, further comprising determining one or more attributes of a plurality of telecommunication network circuits from a central location.

28. The method of claim 25, wherein processing the information according to a predetermined set of rules includes processing the information according to a rules engine utilizing a look-up-table.

29. The method of claim 25, wherein processing the information according to a predetermined set of rules includes processing the information according to a rules engine utilizing a plurality of look-up-tables.

30. The method of claim 25, wherein updating the attributes associated with thetelecommunication network circuits does not affect the software application.

* * * * *

UNITED STATES PATENT AND TRADEMARK OFFICE
CERTIFICATE OF CORRECTION

PATENT NO. : 6,877,008 B1
DATED : April 5, 2005
INVENTOR(S) : Kirkpatrick et al.

It is certified that error appears in the above-identified patent and that said Letters Patent is hereby corrected as shown below:

Title page,
Item [56], References Cited, OTHER PUBLICATIONS,
"CrispORB" reference, "Proceedings or the Eight" should read -- Proceedings of the Eight --.

Column 5,
Line 57, "service provides and" should read -- service providers and --.

Column 8,
Line 50, "servant 82 it and it will" should read -- servant 82 and it will --.

Column 12,
Line 57, "with thetelecommunication network" should read -- with the telecommunication network --.

Signed and Sealed this

Fourth Day of October, 2005

JON W. DUDAS
*Director of the United States Patent and Trademark Office*